United States Patent [19]

Holbein et al.

[11] Patent Number: 5,342,449
[45] Date of Patent: Aug. 30, 1994

[54] PROCESS FOR THE DECONTAMINATION OF TOXIC, HEAVY-METAL CONTAINING SOILS

[76] Inventors: Bruce E. Holbein, 44 Shadybrook Crescent, Guelph, Ontario, Canada, N1G 3G5; Denis K. Kidby, 7 Nelson Street, Belwood, Ontario, Canada, N0B 1J0

[21] Appl. No.: 804,065

[22] Filed: Dec. 9, 1991

[30] Foreign Application Priority Data

Dec. 21, 1990 [AU] Australia .............................. PK3822

[51] Int. Cl.$^5$ ............................................ C22B 3/00
[52] U.S. Cl. ....................................... 134/2; 134/13; 134/25.1; 134/42; 423/22; 423/27; 423/98; 423/109; 423/150.1; 71/903; 106/900
[58] Field of Search ........................ 71/903; 106/900; 405/263; 423/23, 24, 27, 138, 139, 140, 150.1, 98, 99, 100, 101, 22, 109; 134/21, 42, 25.1, 2, 13; 204/105 R

[56] References Cited

U.S. PATENT DOCUMENTS

| | | | |
|---|---|---|---|
| 59,716 | 4/1898 | Netto ................................... | 165/168 |
| 78,500 | 11/1902 | Begeer ................................ | 246/445 |
| 2,051,285 | 8/1938 | Blomfield ........................... | 423/31 |
| 2,079,597 | 5/1937 | Allingham .......................... | 75/734 |
| 2,086,384 | 7/1937 | Rogers ................................ | 75/711 |
| 2,100,865 | 11/1937 | Mills et al. ......................... | 75/735 |
| 2,112,298 | 3/1938 | Mills et al. ......................... | 75/729 |
| 2,124,421 | 7/1938 | Klein .................................. | 75/729 |
| 2,371,119 | 3/1945 | Nachod .............................. | 75/421 |
| 2,477,469 | 7/1949 | Thompson ......................... | 75/737 |
| 2,648,601 | 8/1953 | Byler et al. ........................ | 423/24 |
| 2,753,258 | 7/1956 | Burstall et al. .................... | 423/24 |
| 2,773,025 | 12/1956 | Ricks et al. ........................ | 204/149 |
| 2,810,638 | 10/1957 | Hazen ................................. | 75/744 |
| 2,839,389 | 7/1958 | Kember et al. .................... | 423/24 |
| 3,001,868 | 9/1961 | Aveston et al. ................... | 423/22 |
| 3,317,313 | 5/1967 | Büggs et al. ....................... | 423/24 |
| 3,403,020 | 9/1968 | Lower ................................ | 423/26 |
| 3,656,893 | 4/1972 | Sloan ................................. | 423/24 |
| 3,737,126 | 5/1973 | Fritz et al. ......................... | 244/151 B |
| 3,756,932 | 9/1973 | Zievers et al. .................... | 588/245 |
| 3,764,497 | 10/1973 | Tarjanyi et al. .................. | 204/149 |
| 3,788,983 | 1/1974 | Fries ................................... | 210/667 |
| 3,900,377 | 8/1975 | Enns et al. ......................... | 588/204 |
| 3,970,531 | 7/1976 | Recht ................................. | 588/204 |
| 3,970,737 | 7/1976 | Davidson .......................... | 423/27 |
| 3,984,314 | 10/1976 | Fries ................................... | 210/670 |
| 4,024,037 | 5/1977 | Bishop et al. ..................... | 204/149 |
| 4,029,557 | 6/1977 | Christensen et al. ............ | 210/748 |

(List continued on next page.)

FOREIGN PATENT DOCUMENTS

| | | |
|---|---|---|
| 458734 | 8/1948 | Canada . |
| 517626 | 10/1955 | Canada . |
| 558401 | 6/1958 | Canada . |
| 579633 | 7/1959 | Canada . |
| 583722 | 9/1959 | Canada . |
| 647694 | 8/1962 | Canada . |
| 654821 | 12/1962 | Canada . |

(List continued on next page.)

OTHER PUBLICATIONS

Chemical Abstracts vol. 116 #7 (Feb. 17, 1992) 66424m, Erickson et al.

*Primary Examiner*—David Brunsman
*Attorney, Agent, or Firm*—Ronald S. Kosie; Robert Brouillette

[57] ABSTRACT

The present invention relates to the decontamination of soil and the like and, in particular, soils which are contaminated with metal as a result of the activities of human beings. The invention provides a physical and a chemical means for treating soil aggregate so as to obtain a product aggregate having a relatively low metal content. The physical means is characterized by the classification of a soil aggregate into portions of differing size and metal content. The chemical means is characterized by contacting a soil aggregate with an aqueous lixiviant comprising an organic acid component to lift metal from the aggregate. The physical and chemical means may be used in a combined process for decontaminating soil aggregate.

64 Claims, 3 Drawing Sheets

U.S. PATENT DOCUMENTS

| | | | |
|---|---|---|---|
| 4,267,159 | 5/1981 | Crits | 423/371 |
| 4,273,579 | 6/1981 | Okugawa et al. | 75/722 |
| 4,279,755 | 7/1981 | Himsley | 210/661 |
| 4,321,145 | 3/1982 | Carlson | 210/678 |
| 4,371,506 | 2/1983 | Byleveld | 423/29 |
| 4,372,786 | 2/1983 | Reed et al. | 106/900 |
| 4,394,356 | 7/1983 | Peuser et al. | 423/43 |
| 4,437,996 | 3/1984 | Okugawa | 210/718 |
| 4,528,166 | 7/1985 | McDougall | 423/23 |
| 4,530,963 | 7/1985 | DeVoe et al. | 525/54.1 |
| 4,608,176 | 8/1986 | Fleming | 210/677 |
| 4,626,416 | 12/1986 | Devoe et al. | 423/12 |
| 4,654,322 | 3/1987 | Holbein et al. | 502/403 |
| 4,705,637 | 11/1987 | Heller et al. | 210/670 |
| 4,708,804 | 11/1987 | Coltrinari | 210/677 |
| 4,732,609 | 3/1988 | Frey et al. | 423/24 |
| 4,752,398 | 6/1988 | Holbein et al. | 210/679 |
| 4,770,788 | 9/1988 | Vignola | 210/670 |
| 4,776,932 | 10/1988 | Grossman et al. | 204/105 R |
| 4,980,071 | 12/1990 | Schuster et al. | 210/725 |
| 5,056,541 | 10/1991 | Schade et al. | 134/25.1 |
| 5,114,497 | 5/1992 | Johnson et al. | 134/21 |

FOREIGN PATENT DOCUMENTS

| | | |
|---|---|---|
| 667759 | 7/1963 | Canada . |
| 685345 | 4/1964 | Canada . |
| 781878 | 4/1968 | Canada . |
| 783523 | 4/1968 | Canada . |
| 811077 | 4/1969 | Canada . |
| 882592 | 10/1971 | Canada . |
| 915847 | 11/1972 | Canada . |
| 1016495 | 8/1977 | Canada . |
| 1021573 | 11/1977 | Canada . |
| 1027514 | 3/1978 | Canada . |
| 1037417 | 8/1978 | Canada . |
| 1065272 | 10/1979 | Canada . |
| 1084867 | 9/1980 | Canada . |
| 1152754 | 8/1983 | Canada . |
| 1160018 | 1/1984 | Canada . |
| 1180315 | 1/1985 | Canada . |
| 1228989 | 11/1987 | Canada . |
| 1230741 | 12/1987 | Canada . |
| 1236308 | 5/1988 | Canada . |
| 1236980 | 5/1988 | Canada . |
| 1237283 | 5/1988 | Canada . |
| 1240521 | 8/1988 | Canada . |
| 1244749 | 11/1988 | Canada . |
| 5-55114 | 5/1974 | Japan . |
| 51-55112 | 5/1976 | Japan . |
| 52-03482 | 1/1977 | Japan . |
| 52-65918 | 5/1977 | Japan . |
| 52-65919 | 5/1977 | Japan . |

PROCESS FOR THE DECONTAMINATION OF TOXIC, HEAVY-METAL CONTAINING SOILS

BACKGROUND OF THE INVENTION

The present invention relates to the decontamination of soil and the like (e.g. sediments, etc.) and, in particular, soils which are contaminated with metal as a result of the activities of human beings.

For the purposes of the present invention the following word(s) and expression(s), unless otherwise indicated, shall be understood as having the meaning indicated in respect thereto:

the word "soil" and the like (whether as noun, adjective, etc.) shall be understood as referring to unconsolidated mantle (whether natural or man made) including
  material disposed on dry land masses;
  sediment including any bottom sediments of fresh or marine water systems;
  material which is wholly mineral or which in addition to mineral material, has an organic matter portion derived for example from plant or animal sources; organic material such as plant material would usually form part of the courser aggregate material as described hereinafter and would include, for example, tree stumps, ligneous particles, etc.;
  man-made mineral aggregate material and fill materials as well as man-made sediments arising in waterways; and
  mineral residues from mining operations, such as those present in a tailings pond;

the word "aggregate" and any similar word (whether as noun, adjective, etc.) shall be understood as referring to or as characterizing (or emphasising) a "soil", "sediment", "material" or any portion thereof as a mass of individual particles or components of the same or varied size (e.g. the size of the components may be not uniform and may range from microscopic granules to 10 cm and larger); it is also to be understood that the particle size distribution of any particular soil mass, etc. may be different from that of another soil mass, etc.;

the words/expressions "contaminated", "metal contaminated" and the like, when used in relation to the words "soil", "sediment", "material" and the like, shall be understood as referring to that portion of the unconsolidated mantle (whether natural or man made) which is contaminated, in any way whatsoever, whether voluntarily or otherwise;

the word "lixiviant" shall be understood as referring to a reagent capable of extracting a soluble constituent (i.e. solubilizing) from a solid mass (i.e. the lixiviation of a material);

the words "decontaminate", "decontamination" and the like shall, in relation to metal contaminated material, be understood as referring to a process or the material produced by a process wherein the material or part thereof is provided which has a reduced level of metal as compared to the original material;

the words "classify", "classification" and the like shall, be understood as referring to the dividing of an aggregate material into size groupings or portions and as including separation of constituent components in accordance with size, separation of constituent components by magnetic separation, disaggregation to reduce particle size followed (as desired or necessary) by magnetic separation and/or separation by size (e.g. size separation by screening, gravity separation, etc.).

Metal contaminants include naturally occurring metals as well as metals which normally do not occur in nature (i.e. man made metals); the metals may be present as free or chemically combined species in any state of oxidation chemically possible. Metal contaminants include for example base metals, such as lead, zinc, mercury, cadmium, copper, nickel, chromium and cobalt, as well as other metals such as silver, molybdenum, selenium, arsenic and vanadium, etc. Metal contaminants also include radioactive metals (such as for example radioactive $Co^{60}$ and plutonium) and other inorganic species (such as for example metal complexes based on arsenates, selenates, etc.) which when present in a soil (or sediment) are considered to be a contaminant.

The existence of aggregate material contaminated with metals can lead to serious environmental problems. Contaminated aggregate material if not properly contained or decontaminated can, for example, contribute to unsafe levels of metal(s) in surface and ground water as well as in the air (e.g. by contaminated dust). Aggregate material contaminated with metals can thus affect the health and well being of people living or working in the vicinity of or who come into direct contact with such material.

Contaminated soils, present, for example, on the sites of former or existing industrial complexes, pose a particularly serious problem relative to land use. Since such soils can pose a risk to the health of individuals, the presence of such soils can seriously affect the continued or alternate usage of such sites, e.g. redevelopment of a former industrial site for residential use may be precluded due to the presence of the contaminated soil.

The problems associated with contaminated soils are recognized by governments as being sufficiently important that some have taken steps to establish guidelines or limits for the amount of metal which may be present in soils. Thus, for example, the Waste Management Branch of the provincial government of the province of Ontario (Canada) has issued "Guidelines for the decommissioning and cleanup of sites in Ontario; February 1989". Representative guidelines are illustrated in the following tables wherein Table a-1 shows the upper limits of normal concentrations of metals in soil for a number of metals; i.e. normal background levels of the listed metals; and Table a-2 shows clean-up guidelines with respect to the levels of certain metals.

TABLE a-1

Contaminant Guidelines Representing Upper Limits of Normal Concentrations in Ontario surface soil.

| Metal[1] | Urban | Rural |
|---|---|---|
| Antimony | 8 | 1 |
| Arsenic | 20 | 10 |
| Cadmium | 4 | 3 |
| Chromium | 50 | 50 |
| Cobalt | 25 | 25 |
| Copper | 100 | 60 |
| Iron (%) | 3.5 | 3.5 |
| Lead | 500 | 150 |
| Magnesium | — | 1 |
| Manganese | 700 | 700 |
| Mercury | 0.5 | 0.15 |
| Molybdenum | 3 | 2 |
| Nickel | 60 | 60 |
| Selenium | 2 | 2 |
| Vanadium | 70 | 70 |
| Zinc | 500 | 500 |

Notes:
[1] All units are in ppm (μg/g), dry weight, unless otherwise stated.

TABLE a-2

CLEAN-UP GUIDELINES FOR SOIL

| | Criteria for Proposed Land Use[1] | | | |
|---|---|---|---|---|
| | Agriculture/ Residential/Parkland | | Commercial/ Industrial | |
| Metal[2] | Medium & Fine Textured Soils | Course Textured Soils | Medium & Fine Textured Soils | Course Textured Soils |
| pH (recommended range) | 6–8 | 6–8 | 6–8 | 6–8 |
| Arsenic | 25 | 20 | 50 | 40 |
| Cadmium | 4 | 3 | 8 | 6 |
| Chromium (VI) | 10 | 8 | 10 | 8 |
| Chromium (total) | 1000 | 750 | 1000 | 750 |
| Cobalt | 50 | 40 | 100 | 80 |
| Copper | 200 | 150 | 300 | 225 |
| Lead | 500 | 375 | 1000 | 750 |
| Mercury | 1 | 0.8 | 2 | 1.5 |
| Molybdenum | 5 | 5 | 40 | 40 |
| Nickel | 200 | 150 | 200 | 150 |
| Selenium | 2 | 2 | 10 | 10 |
| Silver | 25 | 20 | 50 | 40 |
| Zinc | 800 | 600 | 800 | 600 |

Notes:
[1]Clean-up guidelines recommended by the Phytotoxicology Section, Air Resources Branch, Ministry of the Environment (Ontario).
[2]All units are in ppm (μg/g), dry weight, unless otherwise stated.

No useful technology has been developed for effective removal of toxic heavy metals from soils (sediments, etc.). Procedures used to date have included in-situ containment or off-site disposal. Both procedures are expensive and in no way deal with detoxification of the soils (sediments, etc.).

A difficulty in dealing with contaminated soils (sediments, etc.) is the overall amount or mass of material which must be dealt with and the relatively small amounts of metals incorporated therein which are responsive for the unacceptable character of the soil.

Accordingly it would be advantageous to have means whereby metal contaminated soil aggregate may be treated to obtain a material which has a reduced level of metal as compared to the starting material.

SUMMARY OF THE INVENTION

In accordance with a general aspect of the present invention there is provided a process for obtaining a coarse soil aggregate size fraction from a metal contaminated soil aggregate comprising a plurality of differently sized components, wherein said metal contaminated soil aggregate comprises said coarse soil aggregate size fraction and a second soil aggregate size fraction,
said coarse soil aggregate size fraction comprising components larger than the components of the second soil aggregate size fraction, said coarse soil aggregate size fraction having a metal concentration lower than that of the metal contaminated soil aggregate, said second soil aggregate fraction having a metal concentration higher than the metal concentration of said coarse soil aggregate size fraction,
and wherein the metal contaminated soil aggregate is classified so as to segregate said coarse soil aggregate size fraction and said second soil aggregate size fraction.

In accordance with another general aspect of the present invention there is also provided in a process for the decontamination of a contaminated soil aggregate so as to obtain a soil product having a metal content lower than that of the metal contaminated soil aggregate, said process including the step of separating metal from said metal contaminated soil aggregate, the step of
contacting said metal contaminated soil aggregate with an aqueous lixiviant for separating metal from said metal contaminated soil aggregate, said lixiviant comprising an organic acid component, said organic acid component comprising one or more carboxylic acids.

More particularly, the present invention provides in a process for the decontamination of a contaminated soil aggregate so as to obtain a soil product having a metal content lower than that of the contaminated soil aggregate, said contaminated soil aggregate comprising at least one metal selected from the group comprising Pb, Ni, Cu, Cd, Zn, Hg, Ag, Au, Pt, and Pd, said process including the step of separating metal from said contaminated soil aggregate, the step of
contacting said contaminated soil aggregate with an aqueous lixiviant for separating metal, present in said contaminated soil aggregate, from said contaminated soil aggregate, said lixiviant comprising an organic acid component, said organic acid component comprising one or more carboxylic acids,
and wherein said metal separated by said lixiviant from said contaminated soil aggregate comprises at least one metal selected from the group comprising Pb, Ni, Cu, Cd, Zn, Hg, Ag, Au, Pt, and Pd.

In accordance with the present invention a second soil aggregate portion as obtained by the classification process referred to above may, if desired, serve as the starting material for the above mentioned lixivication step. Thus, the contaminated soil aggregate to be contained with the lixiviant may be a second soil aggregate size fraction, said second soil aggregate size fraction having been obtained by a classification process wherein a starting metal contaminated soil aggregate comprising a coarse soil aggregate size fraction and said second soil aggregate size fraction, is classified so as to segregate said coarse soil aggregate size fraction and said second soil aggregate size fraction, said starting metal contaminated soil aggregate comprising at least one metal selected from the group comprising Pb, Ni, Cu, Cd, Zn, Hg, Ag, Au, Pt, and Pd, said coarse soil aggregate size fraction comprising components larger than the components of the second soil aggregate size fraction, said coarse soil aggregate size fraction having a metal concentration lower than that of the metal contaminated soil aggregate, said second soil aggregate fraction having a metal concentration higher than the metal concentration of said coarse soil aggregate size fraction and said second soil aggregate size fraction comprising at least one metal selected from the group comprising Pb, Ni, Cu, Cd, Zn, Hg, Ag, Au, Pt, and Pd.

The second soil aggregate portion may, for example, be composed of components having a (screen) size equal to or less than about 0.15 mm.

In accordance with the present invention it has been determined that a soil mass (i.e. a soil aggregate) which is made up of groups of material, the groups of elements having sizes which vary from relatively coarse to relatively fine material does not necessarily have a homogeneous distribution of metal among the various size groupings. On the contrary, it has been determined that for such a soil mass there can be a heterogenous distribution of metal among the various size groupings, e.g. the larger sized materials may have acceptable (i.e. relatively low) levels of metal whereas the smallest sized materials may have unacceptable (i.e. relatively high) levels of metal associated therewith.

As mentioned above, in accordance with the present invention, there is provided a process for treating a metal contaminated soil aggregate to obtain therefrom a mass having an environmentally acceptable metal content. The process is characterized in that the aggregate is classified in accordance with the size of the components thereof so as to segregate a soil portion which has a relatively low (i.e. acceptable) metal content from a soil portion which has a relatively high (i.e. unacceptable) metal content. As shall be described herein the soil portion having the unacceptable metal content may, if desired, be further treated to reduce the metal content thereof to an acceptable level.

Thus in accordance with the present invention such an aggregate soil mass may to be treated by (simple) physical means to segregate the soil mass (in accordance with the size of the components thereof) into a noncontaminated or weakly contaminated fraction(s) and an unacceptably contaminated fraction(s). The divided soil aggregate portion(s) having acceptable metal levels may be released into the environment and the other soil aggregate portion(s) having unacceptable levels of metal may be dealt with conventionally (i.e. be contained) or be sent on for further treatment such as, for example, a treatment which forms another aspect of the present invention. In this manner, the mass of contaminated soil to be dealt with in conventional manner or in accordance with the chemical aspect of the present invention may be significantly reduced; resulting in, for example, in smaller and more manageable storage requirements and/or smaller treatment equipment if the soil is to be treated further.

In accordance with the present invention, a soil mass (and in particular, a sized portion thereof) having an unacceptable level of metal may be subjected to a metal extraction treatment in order to lower the metal content thereof to an acceptable level. This aspect of the invention deals with the chemical processing of contaminated soils to effect the solubilization of toxic metals from the soil; for this purpose an (environmentally acceptable) aqueous (acidic) lixiviant may, if desired, be used which may comprise chemical substances of relatively mild nature. If desired the extracted metal may subsequently be separated/recovered from the lixiviant.

In accordance with the present invention the lixiviant may (as shall be more particulary described hereinafter) comprise one or more organic acids which can be used alone or, if desired, (or necessary) in conjunction with a solubilization aid such as mineral acids (i.e. source of H+), oxidizing agents (such as for example, $H_2O_2$, ozone, hypochlorite), etc. which assist or facilitate the solubilization of metal(s) in the soil material to be treated (i.e. to separate metals from the soil material being treated). Generally metals are taken up into solution as cations or anions or as part of a metal complex with carboxylic acid.

Preferably, in accordance with the present invention a contaminated soil mass is segregated into a noncontaminated or weakly contaminated fraction(s) which may be re-utilized without further treatment, while the unacceptably contaminated fraction(s) is (are) used as the starting material to be chemically treated as disclosed herein. In this manner soils (sediments, etc.) contaminated with a variety of toxic heavy metals can be effectively treated using a combination of physical and chemical means, so as to extract and separately recover the contaminant metals and produce a treated soil (sediment, etc.) substantially free of toxic heavy metals.

The present invention particularly relates to a combined overall process which comprises three basic sub-processes, namely:

a) a soil classification process: the purpose of which is to physically separate a soil portion which may be safely returned to the environment without further treatment and to minimize the amount of material in the remaining soil portion which must be treated to reduce the metal content associated therewith to an acceptable level;

b) a metal solubilization process: the purpose of which is to reduce the metal content of the remaining soil portion to an acceptable level so that the soil fraction may be safely returned to the environment; and c) a metal recovery process: the purpose of which is to separate metal from the metal containing liquor so that the liquor may be recycled or, if desired, discharged to the environment with an acceptable level of metal content;

the stages a) and b) respectively reflect the physical and chemical aspects of the present invention.

BRIEF DESCRIPTION OF THE DRAWINGS

In drawings which illustrate example embodiment(s) of the present invention.

Figure 1:
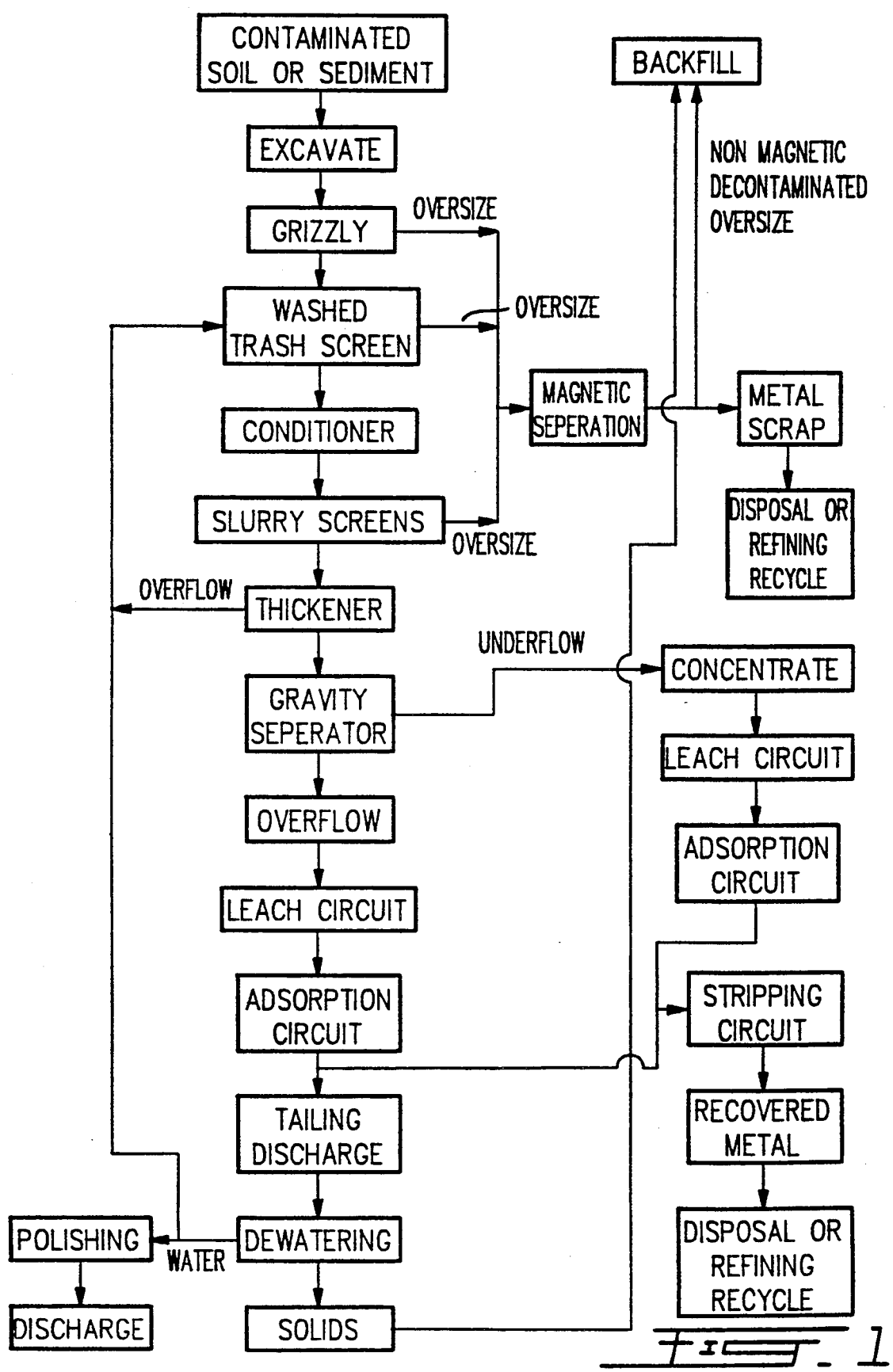
FIG. 1 is a schematic illustration of an example, of an overall process, in accordance with the present invention for the decontamination of soil.

The invention will now, by way of example only, be further described from time to time in reference to an overall process for the treatment of an aggregate soil, the overall process combining the physical and chemical aspects of the present invention; see FIG. 1 which generally illustrates an example treatment flow sheet for the treatment of an aggregate soil excavated from a contaminated site.

a) SOIL CLASSIFICATION PROCESS

The soil classification process may comprise

Figure 2:
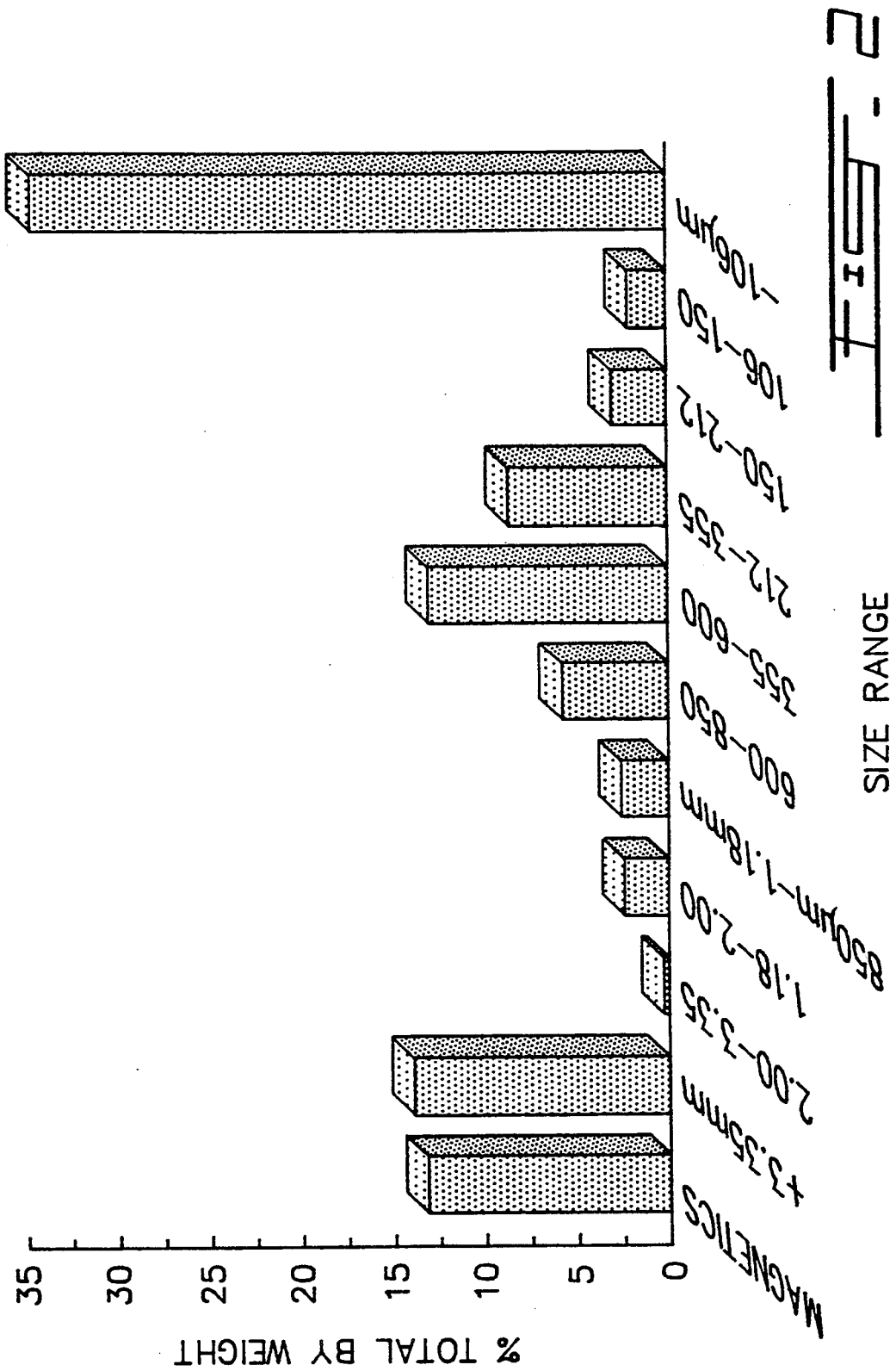
FIG. 2 illustrates the size distribution of a soil after soil classification in accordance with the present invention (the size distribution being shown as passing from mm down to 100's of $\mu m$)

I) classification of an aggregate soil (having, for example, a size distribution range as illustrated in FIG. 2) into PRIMARY COARSE MATERIALS (e.g. material of screen size greater than about 50 mm) subjected, if desired, to a magnetic separation stage prior to transport, for example, to a land fill site SECONDARY COARSE MATERIALS (e.g. material of screen size less than about 50 mm)

II) classification of SECONDARY COARSE MATERIALS with water washing into

TERTIARY COARSE MATERIALS (e.g. material of screen size greater than about 3.0 to 7.0 mm) subjected, if desired, to a magnetic separation stage prior to transport, for example, to a land fill site FINE MATERIALS (e.g. material of screen size less than about 3.0 to 7.0 mm)

III) disaggregation of FINE MATERIALS in the presence of water and classification into UNPOLISHED FINE MATERIALS (e.g. materials of screen size greater than about 0.1 mm) which, if necessary, may be subjected to a polishing wash with weak or dilute metal extraction liquor and, if desired, to a magnetic separation stage prior to transport, for example, to a land fill site UNREFINED FINE MATERIALS (e.g. materials of screen size less than about 0.1 mm) for delivery to a metal solubilization stage.

(The classification may be carried out at ambient temperature and pressure conditions.)

The above example classification sequence may of course be modified to take into consideration the metal content of the particle size groupings of the aggregate material to be classified.

Generally, prior to classification of an soil aggregate, a representative sample thereof may be taken and analyzed to determine the distribution characteristics of metal among various size groupings of the components which make up the soil. The analysis proceeds in two general stages namely, a first stage whereby the sample is classified (i.e. divided up) into desired component size groupings and a second stage wherein each component size grouping is analyzed chemically for its metal content as well as magnetically for ferric metal content; the classification and analysis may be done in known manner.

In any event, the classification process itself proceeds with an eye to physically divide the aggregate soil into a portion having an acceptable (e.g. environmentally acceptable) level of metal and a portion having an unacceptable level of metal content. Generally, this is achieved by obtaining an oversize portion (which is acceptable) and an undersize portion (which is unacceptable). The overall amounts of oversize and final screen size materials after classification will of course vary with the actual starting material being processed.

Figure 3:
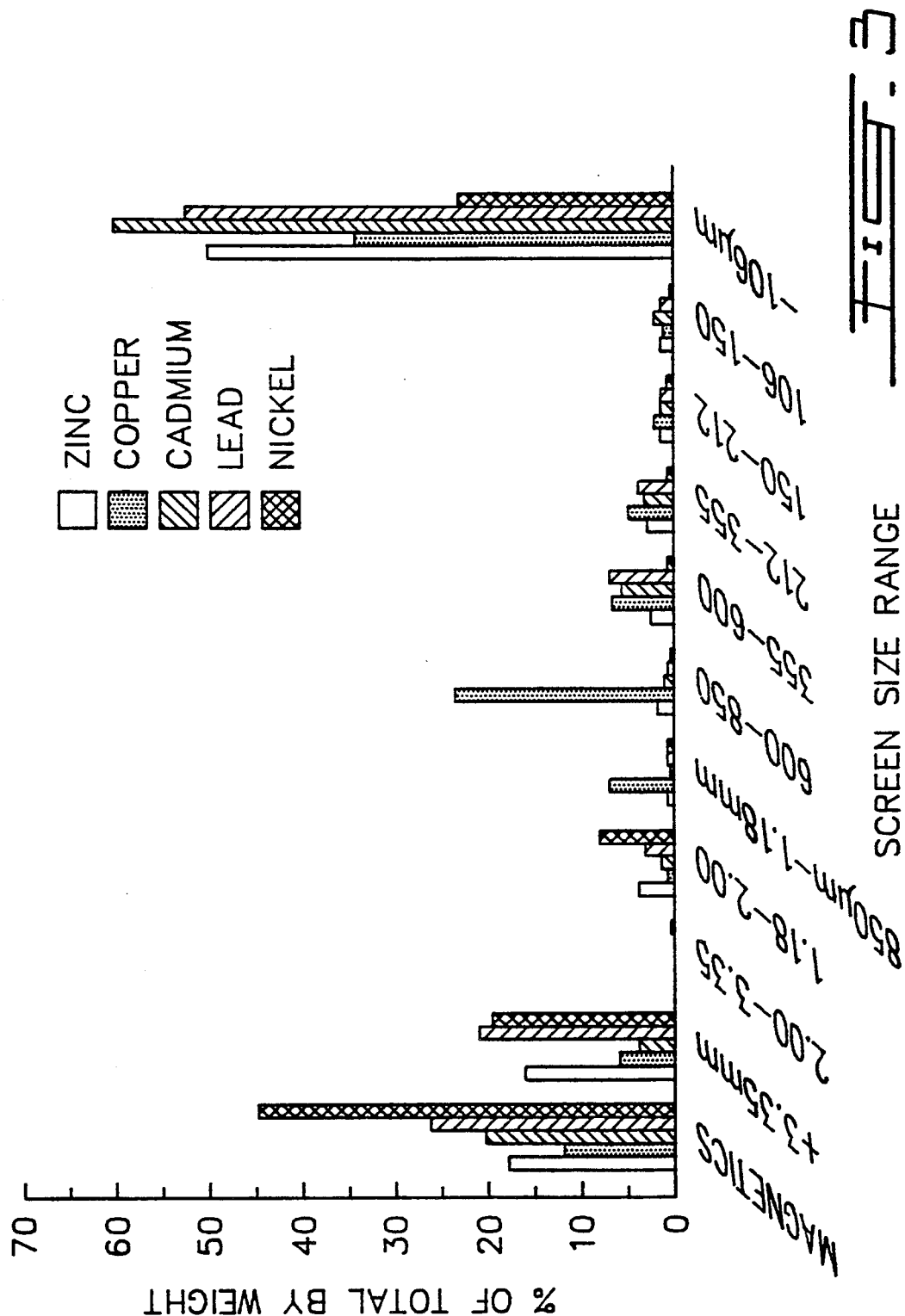
FIG. 3 illustrates the metal distribution in the soil fractions shown in FIG. 2 (the size distribution being shown as passing from mm down to 100's of $\mu m$).

It has been found, however, that classifying to produce a fines portion of a size less than or equal to about 0.15 mm (e.g. less than or equal to 0.106 mm, i.e. −106 μm) and an oversize portion of greater than or equal to about 0.15 mm (e.g. greater than or equal to 0.106 mm, i.e. +106 μm), produces desirable results; metal contaminants tend to be present in reduced quantities in the oversize (+)0.106 mm portion (please see, for example, FIGS. 2 and 3). The size range for the oversize and the fines of any given aggregate soil will, however, in general, be determined with an eye preferably to recovering as much oversize material as possible which is low enough in metal content so as to be environmentally acceptable and to minimize the amount of material having an environmentally unacceptable metal content. In accordance with the present invention, oversize may, for example, comprise material of size greater than 0.106 mm to 10 cm and larger and the undersize may, for example, comprise material of size less than 0.106 mm to 0.001 mm or smaller; where appropriate, the final screen mesh size could of course be increased or decreased, so as to maximize this step, i.e. obtain as much oversize not requiring further treatment as possible.

Thus, generally, the first step in processing (the bulk) of the aggregate soil mass involves passing the aggregate soil through a suitable coarse screen to remove large debris (e.g. material having a size of >50 mm).

The obtained undersized secondary coarse screened material may then be processed through a vibration screen to segregate or divide out materials having a size greater than a predetermined desired size (for example from about 3 to 7 mm). During this screening operation water washing may be carried out to clean the oversize materials as well as to assist smaller materials through the screen, and to effect a partial disaggregation of any friable components.

Classified coarse materials (e.g. materials of a size greater than about 3.0 to 7.0 mm) of the contaminated soil may be substantially free of or have a (sufficiently low) level of metal contamination which meets present environmental criteria; please see, for example, to the above mentioned Ontario guidelines. These classified coarse materials, thus generally, will not require a chemical treatment as shall be described below. However, in the case where scrap iron materials and the like may be present at unacceptable levels, a magnetic separation step (using known magnetic separation equipment such as is employed in the mining industry) has been found to be advantageous; scrap iron along with other associated metal contaminants can thus be physically removed from the coarse fraction as material which is magnetically attracted and separated. The obtained environmentally acceptable classified coarse material, consisting of bits of wood debris, stones, etc. can generally, if desired, be used as backfill.

Depending on the nature of the aggregate soil a magnetic separation step may, if desired, be carried out prior to any other type of classification such as by screening or otherwise. Magnetic separation will provide materials enriched in magnetically separable materials, leaving behind materials depleted in magnetically separable materials.

The obtained undersized materials (e.g. materials of a size less than about 3.0 to 7.0 mm) may be further classified by first being subjected to mechanical conditioning (i.e. dispersed in water so as to form a slurry) using for example a combination of attrition conditioners, high speed conditioners or other equipment capable of causing a substantial disaggregation of materials into particles of a finer size; i.e. for subsequent classification.

Various types of known equipment used in the minerals industry may be employed for the conditioning purposes. The Denver Equipment co. "Attrition Scrubber" may for example be used to this end.

Conditioned, disaggregated materials are then classified through a series of slurry screens or other means of classification (e.g. by a spiral classifier or a hydrocyclone scrubber such as those manufactured by the Denver Equipment Co.) so as to obtain oversize unpolished fine material and undersized unrefined fine material. For example, the disaggregated materials may be classified through a graded series of one or more vibrating wet washed screens of, for example, screen sizes between 3.0 mm and 0.05 mm (standard mining screens— e.g. Tyler Screens from Tyler Equipment Co.).

The unpolished fine material may be substantially free of or have an acceptable (low) level of metal content. Oversize materials include sand, etc. and can, if necessary, be subjected to a magnetic separation treatment to remove iron and associated metal contaminants.

Advantageously, the obtained unpolished fine material (e.g. materials of a size greater than about 0.1 mm) may be polished by being subjected to a wash stage wherein the materials (previously water washed) are washed with a weak solution of metal extraction liquor (which shall be described below) for the purpose of lowering the metal content of the fine material (the wash liquor being recycled for use in other parts of the process or else being released into the environment after any necessary treatment to lower the metal content to acceptable levels). Alternatively, the dilute extractant solution may be brought into contact with the materials in the Attrition scrubbing stage; in this manner facilitating the direct recovery of polished fine materials (e.g. of size >0.1 mm) with relatively low residual metal content. Undersize unrefined fine materials, (e.g. materials of size less than about 0.106 mm), carrying the unacceptable levels of metal contaminants may then be adjusted in terms of water and solids contents by means of a gravity thickener, so as to produce a solids in water suspension of the desired solid content, viscosity and specific gravity for further chemical processing (as shall be described below). As previously mentioned the unrefined materials could alternatively be dealt with by conventional methods (e.g. containment burial).

If advantageous, the unrefined fine materials can be subjected to a further physical treatment by using a gravity separation step, for e.g. spiral classification. For example, any means of physical treatment which will minimize the overall amount of unacceptable material destined for further processing is desirable.

Since the various fractions of the starting soil aggregate themselves comprise a plurality of associated particles these fractions shall be understood as falling within the meaning of the expressions "aggregate material", "soil aggregate", etc. as used herein with respect to the present invention.

METAL SOLUBILIZATION PROCESS

As mentioned above, another general aspect of the present invention relates to the solubilization of metals associated with contaminated soil (sediment, etc.).

In accordance with this aspect, metal contaminated soil aggregate may be treated chemically so as to liberate toxic metal contaminants from soil particles (or fine particles of metal) and achieve metal solubilization to an aqueous phase.

Metal solubilization may be achieved by using an aqueous lixiviant comprising a metal ligand. In accordance with the present invention, satisfactory solubilization of toxic metals can be achieved using a lixiviant based on relatively non-toxic organic materials. Thus the lixiviant can comprise elements which are biodegradable and which do not constitute toxic reagents or (persistents); preferably, the elements are used at concentrations which will not overpower the capacity of an ecosystem to absorb them should the lixiviant somehow be discharged into the natural environment.

Organic (mono-, di- and tri-) carboxylic acids can provide useful metal-ligands for the present invention. Thus, a lixiviant, in accordance with the present invention, may include one or more such organic acids at concentrations ranging, for example, from about 0.01% (w/v) to about 50% (w/v) (the amount of the acid used generally depends on the metal content to be extracted). The lixiviant may additionally include one or more solubilization aids. The lixiviation may generally be carried out at ambient conditions; other conditions may be used provided that they are chosen with an eye on the purpose of the lixiviation (e.g. at an elevated temperature such as up to from about 50–60 C).

The mono- carboxylic acids may have the formula:

$R_1$—COOH, wherein $R_1$ is selected from the group consisting of phenyl and akyl groups having from 1 to 8 carbon atoms, the alkyl group preferably has from 1 to 3 carbon atoms; the monocarboxylic acids include acids such as acetic acid, lactic acid, formic acid and benzoic acid. The monocarboxylic acids (e.g. acetic acid) may be used to take up metals such as Pb, Ni, Cu, Cd, Zn and Hg; these metal may be in the form of free metal, metal colloids, cations or be in complex ionic form.

The dicarboxylic acids may have the formula:

HOOC—$R_2$—COOH, wherein $R_2$ may be selected from the group consisting of a single covalent bond and phenylene and alkylene groups having from 1 to 8 carbon atoms preferably from 1 to 3 carbon atoms (i.e. methylene, ethylene, trimethylene, etc.); the dicarboxylic acids include acids such as oxalic acid, succinic acid, glutaric acid and phthalic acid. The dicarboxylic acids (e.g. oxalic acid) may be used to take up metals such as Ni, Cd, Zn, Cu, Pb, and Hg; these metal may be in the form of free metal, metal colloids, cations or be in complex ionic form.

The tricarboxylic acid may have the formula:

$$CH_2-COOH$$
$$HOOC-CH_2-R_3-COOH$$

wherein $R_3$ is selected from the group consisting of HO—C—, H—C—, $(CH_2)_n$
H—C—, n and m independently being 1 or 2, etc.; $(CH_2)_m$
the tricarboxylic acids include acids such as citric acid. The tricarboxylic acids (e.g. citric acid) may be used to take up metals such as Ni, Cd, Zn, Cu, Pb, and Hg; these metal may be in the form of free metal, metal colloids, cations or be in complex ionic form.

Mono-, di-, and tri- carboxylic acids have the ability to take up a variety of heavy metals which are present in soil (fractions) in ionic form; additionally they promote the solubilization of metal colloids taking up these as well. The ability of any given organic acid to take up a heavy metal is a function of the acid type (i.e. whether the acid is a mono-, di, or tri- carboxylic acid); tricarboxylic acids tend to be more effective on a weight basis.

The solubilizing organic ligand to be used, however, is an organic acid chosen not only for its, —COO— ligand but preferably it's biodegradability as well. Organic acids such as acetic and citric acid are, for example, especially useful because they are used in foodstuffs, residues from their use are readily decomposed by natural biological processes and can be used for the present invention at low concentrations (e.g. 1 to 5% w/v). The lixiviant may have a pH of from between about 0.1 to about 6 (e.g. between about 0.5–3.5 to 6).

The lixiviant solution may also contain a mineral acid to assist the solubilization and control of pH. The mineral acid, if present, is used to provide a source of $H^+$ to get $OH^-$ levels low. $H^+$ will for example be consumed by any carbonate which may be present in the soil fraction; the higher the amount of carbonate in the soil fraction the higher the amount of acid which will have to be used. Since the purpose of the extraction is to solubilize the metal(s), the mineral acid should be chosen with an eye to avoid the production of undesirable insoluble or relatively insoluble materials (i.e. avoid the formation of water insoluble metal salts by the acidic medium used to extract the (e.g. base) metals).

Thus, for example, if lead is present in an amount requiring extraction, a mineral acid such as $H_2SO_4$, if used, is to be used keeping the above in mind, i.e. the use of $H_2SO_4$ may result in the undesired production of relatively insoluble $PbSO_4$. HCl is a preferred mineral acid. Other mineral acids may be used but acids such as $HNO_3$ and $H_3PO_4$ which will upset the ecosystem should be avoided or if used, used in amounts which when put into the natural environment can be absorbed without (significant) harm.

The lixiviant mixture can also be supplemented with a salt such as $NH_4NO_3$ or with salts such as alkali metal (e.g. Na) salts containing chloride or sulphate (keeping in mind the above mentioned admonition with respect to the formation of insoluble salts) or with oxidants such as hydrogen peroxide, ozone, hypochlorite, or with dispersing agents or other organic metal ligands (such as for example Triton X-100 (from Dow Chemical), or other suitable detergents of an ionic or nonionic character (their use being circumscribed by their affect on the natural environment), so as to assist the solubilization of metals from solids.

Dispersing agents can include ionic or non-ionic detergents. In particular, Triton X-100 may be used. Supplemental metal ligands include substances such as nitroloacetic acid, thiol containing reagents such as thiourea or thioglycolic acid (i.e if Hg is present), amine containing reagents such as ethylene diamine or tiethanolamine, carboxylate containing reagents or quaternary nitrogen containing reagents such as quaternary ammonium salts.

In any event any solubilising aids should preferably be chosen with an eye to their toxicity and should be avoided if they would interfere with a chosen method to remove the metals from the soil material or from the lixivant.

A contaminated soil material (e.g. a soil fraction) to be treated is preferably contacted with the lixiviant under agitation, so as to keep soil particles in suspension; the starting soil material may, for example, have a moisture content of field capacity—about for 6 to 15% by weight. The pH of the extraction may be controlled within the above mentioned range and sufficient lixiviant added so as to dissolve contaminating toxic metal (the amount of lixiviant being predetermined based on the metal load in the soil material (e.g. soil fraction) being treated). Extraction is normally allowed to proceed until sufficient metal has dissolved (the duration of the extraction is predetermined by testing a sample of the soil fraction). The extraction may be carried out at ambient temperature; an elevated temperature may also be used (e.g. 50 to 60 degrees C).

Preferably, classified unrefined fine materials obtained from the previously described soil classification process and carrying unacceptable levels of the metal contaminants are treated as above described so as to liberate toxic metal contaminants from the soil portion.

METAL SEPARATION AND RECOVERY PROCESS

The soil-lixiviant mixture, (after the required period of lixiviant leaching of metal has elapsed), may be subjected to a solids-liquid separation step so as to produce a solids material substantially free of lixiviant-metal water solution. This can be achieved for example using decantation with (water) washing of the residues. The decontaminated soil particles can then be dewatered (e.g. by vacuum filtration as in the mining industry), again washed if desired and used for backfill as decontaminated soil.

Lixiviant solution, separated from the soil solids, and containing metal can be treated using any appropriate means available to separate the dissolved metal from the water phase. Metal may for example be recovered using the following techniques:

USE OF METAL ADSORBENT MATERIAL

Metal can be separated from the lixiviant by contacting the metal laden solution with an insoluble metal adsorbent which is then separated from the lixiviant. The metal laden adsorbent is in turn treated with a suitable reagent (e.g. a solution containing a mineral acid) to separate the metals from the adsorbent which may then be re-used to adsorb metal from further lixiviant; the metal being recovered electrochemically, by precipitation, etc. Suitable reagents for separating metal from the insoluble adsorbent composition are, for example, mentioned in the U.S. patents referred to below.

Alternatively, the two procedures of metal solubilization using a lixiviant and adsorption of metal to an adsorbent can be effected simultaneously, e.g. a soil aggregate (fraction) may be treated with a lixiviant in the presence of an insoluble metal adsorbent composition. In such case, the relative size of the soil fraction material is smaller than the size of the adsorbent material so as to allow the adsorbent material to be separated from the slurry mixture by some simple mechanical technique such as filtration, etc.; the adsorbent material may, for example, have a size of about 0.6 mm while the soil aggregate (fraction) to be treated may have a size of less than about 0.1 to 0.2 mm. The advantage of this system is reduced contact time, reducing reactor volume and possibly higher efficiency as the adsorbent acts as a sink for the solubilized metal. After the required contact time, the metal-laden adsorbent is physically recovered (e.g. by filtration) from the mixture. The metals are recovered from the adsorbent and collected separately while the metal-depleted adsorbent is re-utilized.

The lixiviant and the adsorbent material are selected on the basis that the lixiviant components do not undesirably interfere with the adsorbent's role of taking up metal from the lixiviant solution. Additionally the structure of the adsorbent and the contact conditions (e.g. temperature, pH, agitation level, etc.) are such so as to avoid undesirable or avoidable degradation of the insoluble adsorbent.

Insoluble metal adsorbent compositions for recovering metals from aqueous solutions are known; in the context of the present invention reference to an insoluble metal adsorbent composition shall be understood as referring to an adsorbent insoluble in the aqueous lixiviant(s) of the present invention. For the treatment of the metal laden lixiviant of the present invention adsorbents may for example be chosen from among ion exchange resins, inorganic ion exchange materials, chelating resins, examples of such metal scavenging materials include such substances as Chelex TM 20 (industrial grade) or Chelex TM 100 (analytic grade) produced by Bio Rad Laboratories, Toronto, Canada (a similar product is IRC 718 by Rohm & Haas and the Vitrokele TM metal-selective adsorbents produced by Tallon Metal Technologies Inc, Montreal, Canada.

Insoluble metal adsorbent compositions which may possibly be used as adsorbents to remove metals from solution include the following non limiting list:

a) for $Fe^{3+}$, $Th^{4+}$, $UO_2^{2+}$ insoluble compositions such as described in U.S. Pat. No. 4,530,963 may be used wherein the lixiviant may be based on acetic acid and HCl having a pH of about 0.1 to 6;

b) for Hg, Cd, Zn, Cu, Ag, Au, Pt, Pd and Ni an insoluble composition such as described in U.S. Pat. Nos. 4,654,322 and 4,752,398 may be used wherein the lixiviant may be based on acetic acid and HCl having a pH of 0.1 to 6;

c) for arsenate, selenate, vanadate, chromate, etc., ion exchange resins having fixed to the surface thereof strong base groups of formula $-NR_1R_2R_3$ wherein $R_1$, $R_2$ and $R_3$ are suitable organic groups;

d) for arsenate, selenate, vanadate, chromate, etc., an ion exchange resin having fixed to the surface thereof weak base groups of formula $-NHR_1R_2$ wherein $R_1$ and $R_2$ are suitable organic groups; and e) for metal cations and metal complex cations, strong and weak cation exchange resins based upon functional groups such as $-COOH$ $-SO_3H$, $-SO_2R$ wherein R is a suitable organic group.

SEPARATION RECOVERY BY PRECIPITATION

The metal-containing lixiviant obtained after separation of the treated soil fraction therefrom may be treated with a reagent so as to precipitate metals, thereby permitting a physical separation of metal from lixiviant solution. The metal precipitate is recovered (e.g. by filtration, settling, etc.).

Metal precipitation reagents include lime, caustic soda, caustic potash as well as the metal precipitation carbamates; carbamates are for example produced by Buchman Laboratories, Montreal, Canada.

A dithiocarbamate is particularly useful for this purpose because the pH of the lixiviant solution does not require adjustment if the pH is between 2 and 6. Additionally, precipitation of the metals in this manner allows the re-utilization of a substantial portion of the original lixiviant solution. Examples of a useful dithiocarbamate is sodium dimethyldithiocarbamate. In general dithiocarbamates may possibly be used to precipitate metals such as for example Cd, Co, Cu, Hg, Pb, Zn, Ni, etc. from lixiviants comprising acetic acid, citric acid, etc.; the temperature may be from 5 to 30 degrees C; the pH may be 2.0 to 7.0; after precipitation of metal; the so treated lixiviant may possibly be reused. Sodium dimethlydithiocarbamate (obtainable from Buckman Laboratories under the name NAMET) may, for example, be used to precipitate metals such as for example $Ag^{1+}$, $Au^{1+,2+}$, $Cd^{2+}$, $Co^{2+}$, $Cu^{2+}$, $Fe^{3+}$, $Hg^{1+,2+}$ $Mn^{2+}$, $Ni^{2+}$, $Pb^{2+}$, $Zn^{2+}$, $Ca(OH)_2$, NaOH or other similar (alkali or alkaline earth metal) base may be added to the lixiviant solution to achieve the precipitation of metal cations as their corresponding hydroxides. These reagents are, however, less useful due to the addition of undesirable ions such as for example sodium or calcium ions; the pH of the lixiviant must also be adjusted (for example raised to a pH of about 7.0 to about 9.0. The temperature of the lixivient may be ambient (e.g. from about 5 to 40 degrees C) for the additions.

A similar approach could be taken so as to achieve the precipitation of the contained metals as their sulphides using for example alkali metal sulphides such as sodium sulphide.

SEPARATION RECOVERY BY ELECTROPLATING

Lixiviant solution containing extracted metals can also be treated using electrochemical means so as to collect the metals as metal deposits on the cathode of the device used. This is useful where metal content is high and of the type which readily deposits to cathodes, e.g. copper, zinc and lead. Cathodes can be made from copper, zinc or other suitable material and anodes can be made from any suitable material. In particular, anodes can be of the DSA type (i.e. dimensionally stable anodes), as supplied by Eltech Systems Corporation of the U.S.A. Alternatively the metal may be so recovered from the liquor obtained after eluting the adsorbent with an elution solution to separate the metals thereon.

Any water wash liquors obtained may be incorporated into the process or subjected to a metal recovery treatment before being released into the natural environment.

The aggregate material fractions having acceptable metal contents may, if desired, be recombined for disposal instead of being disposed of separately. Any remaining aggregate material having an unacceptable metal content may as mentioned above be dealt with conventionally (i.e. by containment burial); the advantage being the reduced amount of material which would have to be handled in this way.

The invention will now be described by reference to the following non-limiting examples:

EXAMPLE 1

In accordance with this example, a metal contaminated soil is classified into coarse fractions of relatively low metal content and fine fractions relatively rich in metal content. About 2 Kg of contaminated soil having a solid size distribution ranging from about 0.001 mm to about 15 cm (i.e. comprising silt, sand, gravel and rock like materials, having 15% water, 85% solid materials and 2% or less vegetable material—by weight) from an industrial site where metal fabrication had been carried out was passed through a grizzly screen (i.e a screen having relatively large openings e.g. 5.0 cm) to remove large debris and the undersize was then conditioned by mechanical mixing in water at 40% w/w solids. Materials greater than ¼" diameter were thereafter removed by passing the obtained slurry through a screen; the material greater than ¼" was rinsed with water and retained. The material of size less than ¼" diameter was conditioned in an attrition scrubber which exploits shear forces to reduce the size of materials such as a Denver Attrition scrubber made by the Denver Equipment co. for 15 minutes and then separated into materials of size greater than 0.106 mm and materials of size less than 0.106 mm. The coarse fractions were washed on the screen and added to the materials of size greater than ¼" from the first screening. Analyses were made of the metal contamination levels in the washed materials of size greater than (+) 0.106 mm and those less than (−) 0.106 mm in size and expressed in terms of μg of metals per gram of material (ppm); the results are shown in the table A below.

TABLE A

| SAMPLE | % OF TOTAL SOIL MASS | ppm METALS | | | | |
|---|---|---|---|---|---|---|
| | | Zn | Cu | Cd | Pb | Ni |
| WHOLE SOIL (not washed) | 100% | 4796 | 1717 | 13 | 1421 | 151 |

TABLE A-continued

| SAMPLE | % OF TOTAL SOIL MASS | ppm METALS | | | | |
|---|---|---|---|---|---|---|
| | | Zn | Cu | Cd | Pb | Ni |
| +0.106 mm not washed coarse | 70% | 2044 | 1006 | 5.3 | 987 | 134 |
| −0.106 mm contaminated fine | 30% | 7990 | 1630 | 22 | 2010 | 120 |

EXAMPLE 2

Metal contaminated fines fraction of soil as prepared in example 1 was suspended in water containing various metal solubilizing agents, adjusted to various pH values with either sulphuric acid or hydrochloric acid and mixed for 12 hours. After the extraction period, the solids were separated from the extraction liquid and metal contents in the extraction liquid were analyzed; the results are shown in table B; expressed in terms of mg of metals per liter of solution.

TABLE B

| EXTRACTION LIQUID | pH | pH ADJUSTED WITH | ppm metal in extraction liquid | | | |
|---|---|---|---|---|---|---|
| | | | Zn | Cu | Cd | Pb |
| Water with 5% w/v acetic acid | 3.5 | $H_2SO_4$ | 744 | 65 | 3 | 4 |
| Water with 5% w/v citric acid | 3.5 | $H_2SO_4$ | 370 | 21 | 3 | 3 |
| Water only | 3.5 | $H_2SO_4$ | 30 | 10 | 1 | 5 |
| Water with 1% w/v acetic acid 1% w/v NaCl 1% w/v $NH_4NO_3$ | 2.0 | HCl | 700 | 100 | 4 | 500 |

EXAMPLE 3

The influence of oxidizing conditions during extraction of metals from fines as prepared in example 1, with extraction into water containing 1% NaCl, 1% acetic acid and 1% $NH_4NO_3$ (w/v) was examined by adding hydrogen peroxide to maintain conditions which would promote oxidization of any solubilized Fe from the soluble $Fe^{2+}$ state to the relatively insoluble $Fe^{3+}$ at pH 2.0. The results are shown in table C.

TABLE C

| CONDITION | ppm metal in extraction fluid | | | | | |
|---|---|---|---|---|---|---|
| | Zn | Cu | Fe | Cd | Ni | Pb |
| Extraction without $H_2O_2$ | 471 | 82 | 567 | 3.6 | 11.4 | 594 |
| Extraction with $H_2O_2$ | 480 | 101 | 30 | 3.5 | 11.2 | 561 |

EXAMPLE 4
RECOVERY OF METALS FROM EXTRACTED SOIL

Extracted soil fractions as obtained in Example 3 were either separated by filtration to produce a solids free extractant or used as a leach soil slurry for metal recovery tests with Vitrokele TM 745. The Vitrokele 745 was used in an amount of 20% v/v of slurry; the adsorption being carried out at pH 2.0, 20 C and for a contact time of 30 minutes. Metal recovery results are shown below in table D.

TABLE D

| CONDITIONS | ppm metal in extract after contact With Vitrokele TM 745 | | | | | |
|---|---|---|---|---|---|---|
| | Zn | Cu | Fe | Cd | Ni | Pb |
| Solids free extract treated with Vitrokele TM | 0.90 | 0.4 | 0.03 | 0.4 | 0 | 7 |
| Soil slurry extract treated with Vitrokele TM | 0.328 | 0.428 | 0.345 | 0.04 | 0 | 6.4 |
| No treatment | 528 | 111 | 163 | 3.9 | 18.1 | 678 |

EXAMPLE 5

Tests similar to those shown in Example 4 were carried out with solids free extracts as prepared in Example 3 using two different ion exchange resins; Chelex 20 and a strong acid cation exchange resin (COO type IRC 200 from Rohm & Haas).

While results similar to those shown in Example 4 were obtained with Chelex 20, strong acid cation exchange resins were found to be quite inefficient. The latter inefficiency was in part related to the large amounts of $Ca^{2+}$ liberated from the soil during extraction of the heavy metals. Thus while a strong acid cation exchange resin may be used it should preferably be used in relation to soils from which no or low amounts of Ca are released otherwise a prohibitive amount of resin will be needed.

EXAMPLE 6

A solids free filtrate of a metal extractant as prepared in Example 4, was separately tested for metal removal by precipitation with on the one hand NAMET (a sodium dimethyldithiocarbamate from Buchman Laboratories) and with lime on the other hand. For the carbamate test, the carbamate was added in small aliquots (e.g. 1 ml of reagent for 100 ml of liquor) until no further precipitation is found. For the test using lime as the precipitant, sufficient lime was added (e.g. 10 ml of aqueous lime slurry for 100 ml of liquor) to raise the pH from 2.0 to 7.0. The results are shown below in table E.

TABLE E

| CONDITIONS | FINAL pH | ppm in liquid | | | | | |
|---|---|---|---|---|---|---|---|
| | | Zn | Cu | Fe | Cd | Ni | Pb |
| Filtrate of soil extract not further treated | 2.0 | 528 | 111 | 163 | 3.9 | 18.1 | 678 |
| Treatment with dithiocarbamate | 2.0 | 1.1 | 0.17 | 0.02 | 0.006 | 0.0 | 0.0 |
| Treatment with lime | 7.0 | 4.0 | 0.12 | 20.9 | 2.2 | 0.0 | 0.0 |

EXAMPLE 7

Vitrokele TM 745 (V-745) as loaded with adsorbed metals as prepared in example 4 was stripped with various acids (2 volumes of appropriate acid per 1 volume of adsorbent) so as to recover the contained metals; recovered metals measured as ppm in recovered acid strip solution; see Table F below.

TABLE F

| STRIP SOLUTION | ppm metals in strip solution | | | | | |
| --- | --- | --- | --- | --- | --- | --- |
| | Zn | Cu | Fe | Cd | Ni | Pb |
| 10% H$_2$SO$_4$ | 384 | 400 | 2810 | 1.5 | 26.3 | 5.7 |
| 10% HCL | 386 | 368 | 2779 | .3 | 24.6 | 216 |
| 10% METHANE SULPHONIC ACID | 387 | 373 | 2664 | 1.5 | 25.8 | 336 |
| 1% CITRIC ACID pH 3.0 | 6.1 | 2.6 | 1500 | .07 | .43 | 12 |

EXAMPLE 8

Metals removed from Vitrokele ™ 745 (V-745) with 10% methane sulphonic acid (obtained from Eastman Kodak) were recovered by electrowining using DSA anodes and Cu mesh cathodes at a current density of 4.0 amp/ft$^2$ cathode surface and a voltage of 2.5 v. Metal removal to the cathode surface was measured by monitoring the disappearance of soluble metal in the methane sulphonic acid. See table G below.

TABLE G

| TIME OF ELECTROWINING | ppm metal in solution | | | | | |
| --- | --- | --- | --- | --- | --- | --- |
| | Zn | Cu | Fe | Cd | Ni | Pb |
| 0 | 544 | 154 | 1504 | 3.2 | 18.1 | 657 |
| 30 MINUTES | 421 | 66 | 1160 | 2.4 | 15.6 | 270 |
| 1 HOUR | 391 | 37 | 1104 | 2.0 | 15.8 | 149 |
| 3 HOURS | 273 | 2.1 | 816 | 0.5 | 11.7 | 2.5 |
| 6 HOURS | 273 | 0.3 | 836 | 0.3 | 11.7 | 0.3 |

EXAMPLE 9

Vitrokele ™ 745 (V-745) loaded with metals as prepared in Example 4 was stripped with 10% methane sulphonic acid, rinsed with water and tested for its further ability to recover metals from leached soil extractant slurry. The adsorption kinetics for a first adsorption test were compared to those for a second test after stripping and rinsing. See table H below.

TABLE H

| CONDITIONS | TIME | ppm metal remaining in solution | | | | | |
| --- | --- | --- | --- | --- | --- | --- | --- |
| | | Zn | Cu | Fe | Cd | Ni | Pb |
| No Vitrokele ™ V-745 | 0 | 632 | 118 | 691 | 4.1 | 16.5 | 732 |
| Virgin V-745 | 30 min | 8.4 | 2.0 | 20.1 | 0.5 | 0.0 | 42 |
| Re-used V-745 | | 6.0 | 1.7 | 12.9 | 0.4 | 0.1 | 26 |
| Virgin V-745 | 3 hrs | 4.5 | 0.9 | 11.6 | 0.4 | 0.0 | 28 |
| Re-used V-745 | | 2.5 | 0.9 | 8.5 | 0.3 | 0.2 | 16 |

EXAMPLE 10

An industrially-contaminated soil sample was separated into washed coarse materials of a size greater than 0.106 mm and contaminated fines of a size less than 0.106 mm. The fines were extracted using water containing 1% NaCl, 1% acetic acid, 1% NH$_4$NO$_3$ at a pH of 2.0 using HCL to maintain pH during an extraction period of 12 hrs. The extracted soil slurry was then contacted with Vitrokele ™ 745 (V-745) (20% V-745 v/v in slurry, agitated sufficiently to suspend Vitrokele in the slurry uniformally) to adsorb the extracted metals and thereafter the soil residues were recovered and washed. A portion of the extraction liquor after metal adsorption and solids removal was diluted (with water) to 10% of its original strength and used to rinse the water washed coarse materials of a size greater than 0.106 mm. Residual metal analyses were conducted on the intact soil, not treated, and in the processed fractions with the results obtained shown below in table I.

TABLE I

| SAMPLE | ppm metal contents | | | | |
| --- | --- | --- | --- | --- | --- |
| | Zn | Cu | Cd | Ni | Pb |
| 1. Whole soil | 2340 | 1700 | 14 | 150 | 2640 |
| 2. Washed coarse materials not rinsed with extract | 900 | 800 | 6 | 60 | 638 |
| 3. Washed coarse materials rinsed with extract | 303 | 214 | 1 | 14 | 182 |
| 4. Contaminated fines not extracted | 1770 | 1995 | 22.5 | 120 | 1975 |
| 5. Contaminated fines extracted | 400 | 290 | 1.5 | 68 | 756 |
| 6. Re-constituted soil (3. + 5.) | 332 | 237 | 1.2 | 25 | 354 |

EXAMPLE 11

A contaminated soil from a former pipe manufacturing facility was examined to determine what metal could be removed by magnetic retrieval with results as shown below in table J; the analysis of the non magnetic fraction is also as below:

TABLE J

| SAMPLE | % OF SOIL MASS | ppm metal | | | | | |
| --- | --- | --- | --- | --- | --- | --- | --- |
| | | Zn | Cu | Fe | Cd | Ni | Pb |
| Whole soil | 100 | 4800 | 1600 | 62000 | 13 | 151 | 1420 |
| Magnetically retrieved fraction | 13 | 6860 | 2170 | 352000 | 20 | 728 | 2000 |
| non magnetically retrieved fraction | 87 | 3554 | 1058 | 21683 | 9.6 | 112 | 1162 |

What we claim:

1. In a process for the decontamination of a contaminated soil aggregate so as to obtain a soil product having a metal content lower than that of the contaminated soil aggregate, said contaminated soil aggregate comprising at least one metal selected from the group comprising Pb, Ni, Cu, Cd, Zn, Hg, Ag, Au, Pt, and Pd, said process including the step of separating metal from said contaminated soil aggregate, the step of contacting said contaminated soil aggregate with an aqueous lixiviant for separating metal, present in said contaminated soil aggregate, from said contaminated soil aggregate, said lixiviant comprising an organic acid component, said organic acid component comprising one or more carboxylic acids,
and wherein said metal separated by said lixiviant from said contaminated soil aggregate comprises at least one metal selected from the group comprising Pb, Ni, Cu, Cd, Zn, Hg, Ag, Au, Pt, and Pd.

2. A process as defined in claim 1 wherein said organic acid component comprises one or more members selected from the group consisting of monocarboxylic acids having from 2 to 4 carbon atoms, dicarboxylic acids having from 3 to 5 carbon atoms and tricarboxylic acids having from 6 to 8 carbon atoms.

3. A process as defined in claim 2 wherein said lixiviant comprises a mineral acid component in addition to said organic acid component, said mineral acid component being selected from the group consisting of HCl, H₂SO₄ and mixtures thereof.

4. A process as defined in claim 2 wherein said lixiviant comprises a mineral acid component in addition to said organic acid component, said mineral acid component being HCl.

5. A process as defined in claim 1 wherein said lixiviant has a pH in the range of from about 0.1 to about 6.

6. A process as defined in claim 1 wherein said organic acid component is present at a concentration ranging from between about 0.01% and about 50% (w/v).

7. A process as defined in claim 1 wherein said organic acid component is present at a concentration ranging from between about 0.01% and about 50% (w/v), said lixiviant has a pH in the range of from about 0.1 to about 6 and said organic acid component comprises one or more acid members selected from the group consisting of acetic acid, citric acid and oxalic acid.

8. A process as defined in claim 7 wherein said organic acid component comprises acetic acid, the acetic acid being present at a concentration ranging from between about 0.01% and about 5% (w/v).

9. A process as defined in claim 7 wherein said organic acid component comprises citric acid, the citric acid being present at a concentration ranging from between about 0.01% and about 5% (w/v).

10. A process as defined in claim 7 wherein said organic acid component comprises oxalic acid, the oxalic acid being present at a concentration ranging from between about 0.01% and about 5% (w/v).

11. A process as defined in claim 1 wherein said lixiviant comprises a mineral acid component in addition to said organic acid component.

12. A process as defined in claim 1 wherein lixiviant laden with metal from said soil aggregate is separated from said soil aggregate and the so obtained lixiviant laden with metal is subjected to a metal separation treatment so as to separate metal therefrom.

13. A process as defined in claim 12 wherein said so obtained lixiviant is subjected to a metal precipitation treatment so as to effect the precipitation of metal.

14. A process as defined in claim 12 where said so obtained lixiviant is subjected to an electrolysis treatment so as to separate the metal therefrom.

15. A process as defined in claim 12 wherein said so obtained lixiviant is contacted with an insoluble metal adsorbent composition so as to separate metal therefrom.

16. A process as defined in claim 1 wherein said contact is carried out in the presence of an insoluble metal adsorbent composition so as to provide a metal laden adsorbent composition, the obtained metal laden adsorbent composition is separated from the lixiviant and the soil aggregate and the so separated metal laden adsorption composition is subjected to a metal separation treatment so as to separate metal therefrom.

17. A process as defined in claim 1 wherein said metal separated by said lixiviant from said metal contaminated soil aggregate comprises at least one metal selected from the group comprising Cd, Cu, Hg, Pb, Zn, and Ni.

18. A process as defined in claim 1 wherein the contaminated soil aggregate contacted with the lixiviant is a second soil aggregate size fraction, said second soil aggregate size fraction having been obtained by a classification process wherein a starting metal contaminated soil aggregate comprising a coarse soil aggregate size fraction and said second soil aggregate size fraction, is classified so as to segregate said coarse soil aggregate size fraction and said second soil aggregate size fraction, said starting metal contaminated soil aggregate comprising at least one metal selected from the group comprising Pb, Ni, Cu, Cd, Zn, Hg, Ag, Au, Pt, and Pd, said coarse soil aggregate size fraction comprising components larger than the components of the second soil aggregate size fraction, said coarse soil aggregate size fraction having a metal concentration lower than that of the metal contaminated soil aggregate, said second soil aggregate fraction having a metal concentration higher than the metal concentration of said coarse soil aggregate size fraction and said second soil aggregate size fraction comprising at least one metal selected from the group comprising Pb, Ni, Cu, Cd, Zn, Hg, Ag, Au, Pt, and Pd.

19. A process as defined in claim 18 wherein said organic acid component comprises one or more members selected from the group consisting of monocarboxylic acids having from 2 to 4 carbon atoms, dicarboxylic acids having from 3 to 5 carbon atoms and tricarboxylic acids having from 6 to 8 carbon atoms.

20. A process as defined in claim 18 wherein said lixiviant has a pH in the range of from about 0.1 to about 6.

21. A process as defined in claim 18 wherein said organic acid component is present at a concentration ranging from between about 0.1% and about 50% (w/v).

22. A process as defined in claim 18 wherein said organic acid component is present at a concentration ranging from between about 0.01% and about 50% (w/v), said lixiviant has a pH in the range of from about 0.1 to about 6 and said organic acid component comprises one or more acid members selected from the group consisting of acetic acid, citric acid and oxalic acid.

23. A process as defined in claim 22 wherein said organic acid component comprises acetic acid, the acetic acid being present at a concentration ranging from between about 0.01% and about 5% (w/v).

24. A process as defined in claim 22 wherein said organic acid component comprises citric acid, the citric acid being present at a concentration ranging from between about 0.01% and about 5% (w/v).

25. A process as defined in claim 22 wherein said organic acid component comprises oxalic acid, the oxalic acid being present at a concentration ranging from between about 0.01% and about 5% (w/v).

26. A process as defined in claim 22 wherein said lixiviant comprises a mineral acid component in addition to said organic acid component, said mineral acid component being selected from the group consisting of HCl, H₂SO₄ and mixtures thereof.

27. A process as defined in claim 22 wherein said lixiviant comprises a mineral acid component in addition to said organic acid component, said mineral acid component being HCl.

28. A process as defined in claim 22 wherein said organic acid component comprises acetic acid, the acetic acid being present at a concentration ranging from between about 0.01% and about 5% (w/v) and wherein said lixiviant comprises a mineral acid component in addition to said organic acid component, said mineral acid component being selected from the group consisting of HCl, H₂SO₄ and mixtures thereof.

29. A process as defined in claim 28 wherein said metal separated by said lixiviant from said second soil aggregate size fraction comprises at least one metal selected from the group comprising Cd, Cu, Hg, Pb, Zn and Ni.

30. A process as defined in claim 28 wherein mineral acid component is HCl.

31. A process as defined in claim 30 wherein said metal separated by said lixiviant from said second soil aggregate size fraction comprises at least one metal selected from the group comprising Cd, Cu, Hg, Pb, Zn and Ni.

32. A process as defined in claim 22 wherein said organic acid component comprises citric acid, the citric acid being present at a concentration ranging from between about 0.01% and about 5% (w/v) and wherein said lixiviant comprises a mineral acid component in addition to said organic acid component, said mineral acid component being selected from the group consisting of HCl, H₂SO₄ and mixtures thereof.

33. A process as defined in claim 32 wherein said metal separated by said lixiviant from said second soil aggregate size fraction comprises at least one metal selected from the group comprising Cd, Cu, Hg, Pb, Zn and Ni.

34. A process as defined in claim 32 wherein said mineral acid component is HCl.

35. A process as defined in claim 34 wherein said metal separated by said lixiviant from said second soil aggregate size fraction comprises at least one metal selected from the group comprising Cd, Cu, Hg, Pb, Zn and Ni.

36. A process as defined in claim 22 wherein said organic acid component comprises oxalic acid, the oxalic acid being present at a concentration ranging from between about 0.01% and about 5% (w/v) and wherein said lixiviant comprises a mineral acid component in addition to said organic acid component, said mineral acid component being selected from the group consisting of HCl, H₂SO₄ and mixtures thereof.

37. A process as defined in claim 36 wherein said metal separated by said lixiviant from said second soil aggregate size fraction comprises at least one metal selected from the group comprising Cd, Cu, Hg, Pb, Zn and Ni.

38. A process as defined in claim 36 wherein said mineral acid component is HCl.

39. A process as defined in claim 38 wherein said metal separated by said lixiviant from said second soil aggregate size fraction comprises at least one metal selected from the group comprising Cd, Cu, Hg, Pb, Zn and Ni.

40. A process as defined in claim 18 wherein said lixiviant comprises a mineral acid component in addition to said organic acid component.

41. A process as defined in claim 18 wherein lixiviant laden with metal from said soil is separated from said soil aggregate and the so obtained lixiviant laden with metal is subjected to a metal separation treatment so as to separate metal therefrom.

42. A process as defined in claim 40 wherein said so obtained lixiviant is subjected to a metal precipitation treatment so as to effect the precipitation of metal.

43. A process as defined in claim 40 where said so obtained lixiviant is subjected to an electrolysis treatment so as to separate the metal therefrom.

44. A process as defined in claim 41 wherein said so obtained lixiviant is contacted with an insoluble metal adsorbent composition so as to separate metal therefrom.

45. A process as defined in claim 18 wherein said contact is carried out in the presence of an insoluble metal adsorbent composition so as to provide a metal laden adsorbent composition, the obtained metal laden adsorbent composition is separated from the lixiviant and the soil aggregate and the so separated metal laden adsorption composition is treated to recover metal associated therewith.

46. A process as defined in claim 18 wherein said metal separated by said lixiviant from said second soil aggregate size fraction comprises at least one metal selected from the group comprising Cd, Cu, Hg, Pb, Zn and Ni.

47. A process as defined in claim 1 wherein the contaminated soil aggregate contacted with the lixiviant is a second soil aggregate size fraction, said second soil aggregate size fraction having been obtained by a classification process wherein a starting metal contaminated soil aggregate comprising a coarse soil aggregate size fraction and said second soil aggregate size fraction, is classified so as to segregate said coarse soil aggregate size fraction and said second soil aggregate size fraction, said starting metal contaminated soil aggregate comprising at least one metal selected from the group comprising Pb, Ni, Cu, Cd, Zn, Hg, Ag, Au, Pt, and Pd, said coarse soil aggregate size fraction comprising components larger than the components of the second soil aggregate size fraction, said second soil aggregate portion being composed of components having a size equal to or less than about 0.15 mm, said coarse soil aggregate size fraction having a metal concentration lower than that of the metal contaminated soil aggregate, said second soil aggregate fraction having a metal concentration higher than the metal concentration of said coarse soil aggregate size fraction and said second soil aggregate size fraction comprising at least one metal selected from the group comprising Pb, Ni, Cu, Cd, Zn, Hg, Ag, Au, Pt, and Pd.

48. A process as defined in claim 47 wherein said organic acid component comprises one or more members selected from the group consisting of monocarboxylic acids having from 2 to 4 carbon atoms, dicarboxylic acids having from 3 to 5 carbon atoms and tricarboxylic acids having from 6 to 8 carbon atoms.

49. A process as defined in claim 47 wherein said lixiviant has a pH in the range of from about 0.1 to about 6.

50. A process as defined in claim 47 wherein said organic acid component is present at a concentration ranging from between about 0.01% and about 50% (w/v).

51. A process as defined in claim 47 wherein said organic acid component is present at a concentration ranging from between about 0.01% and about 50% (w/v), said lixiviant has a pH in the range of from about 0.1 to about 6 and said organic acid component comprises one or more acid members selected from the group consisting of acetic acid, citric acid and oxalic acid.

52. A process as defined in claim 51 wherein said organic acid component comprises acetic acid, the acetic acid being present at a concentration ranging from between about 0.01% and about 5% (w/v).

53. A process as defined in claim 51 wherein said organic acid component comprises citric acid, the citric acid being present at a concentration ranging from between about 0.01% and about 5% (w/v).

54. A process as defined in claim 51 wherein said organic acid component comprises oxalic acid, the oxalic acid being present at a concentration ranging from between about 0.01% and about 5% (w/v).

55. A process as defined in claim 51 wherein said lixiviant comprises a mineral acid component in addition to said organic acid component, said mineral acid component being selected from the group consisting of HCl, $H_2SO_4$ and mixtures thereof.

56. A process as defined in claim 51 wherein said lixiviant comprises a mineral acid component in addition to said organic acid component, said mineral acid component being HCl.

57. A process as defined in claim 47 wherein said lixiviant comprises a mineral acid component in addition to said organic acid component.

58. A process as defined in claim 47 wherein lixiviant laden with metal from said soil aggregate is separated from said soil aggregate and the so obtained lixiviant laden with metal is treated so as to separate metal therefrom.

59. A process as defined in claim 58 wherein said so obtained lixiviant is subjected to a metal precipitation treatment so as to effect the precipitation of metal.

60. A process as defined in claim 58 wherein said so obtained lixiviant is subjected to an electrolysis treatment so as to separate the metal therefrom.

61. A process as defined in claim 58 wherein said so obtained lixiviant is contacted with an insoluble metal adsorbent composition so as to separate metal therefrom.

62. A process as defined in claim 47 wherein said contact is carried out in the presence of an insoluble metal adsorbent composition so as to provide a metal laden adsorbent composition, the obtained metal laden adsorbent composition is separated from the lixiviant and the soil aggregate and the so separated metal laden adsorption composition is treated to recover metal associated therewith.

63. A process as defined in claim 47 wherein said metal separated by said lixiviant from said second soil aggregate size fraction comprises at least one metal selected from the group comprising Cd, Cu, Hg, Pb, Zn and Ni.

64. A process as defined in claim 1 wherein said lixiviant comprises $NH_4NO_3$ in addition to said organic acid component.

* * * * *

UNITED STATES PATENT AND TRADEMARK OFFICE
CERTIFICATE OF CORRECTION

PATENT NO. : 5,342,449
DATED : August 30th, 1994
INVENTOR(S) : HOLBEIN, Bruce E.

It is certified that error appears in the above-indentified patent and that said Letters Patent is hereby corrected as shown below: Claims 42 & 43 should read as follows:

42. A process as defined in claim 41 wherein said so obtained lixiviant is subjected to a metal precipitation treatment so as to effect the precipitation of metal.

43. A process as defined in claim 41 where said so obtained lixiviant is subjected to an electrolysis treatment so as to separate the metal therefrom.

Signed and Sealed this

Tenth Day of November 1998

*Attest:*

BRUCE LEHMAN

*Attesting Officer*  Commissioner of Patents and Trademarks